June 24, 1930.  A. E. CRANSTON  1,767,580
CORRUGATED FASTENER DRIVING MECHANISM
Filed May 29, 1929    3 Sheets-Sheet 1
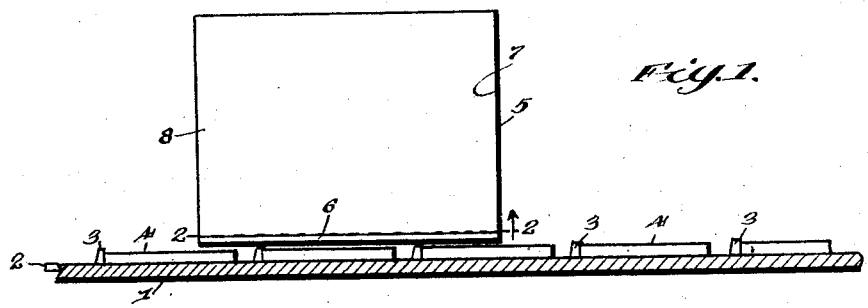
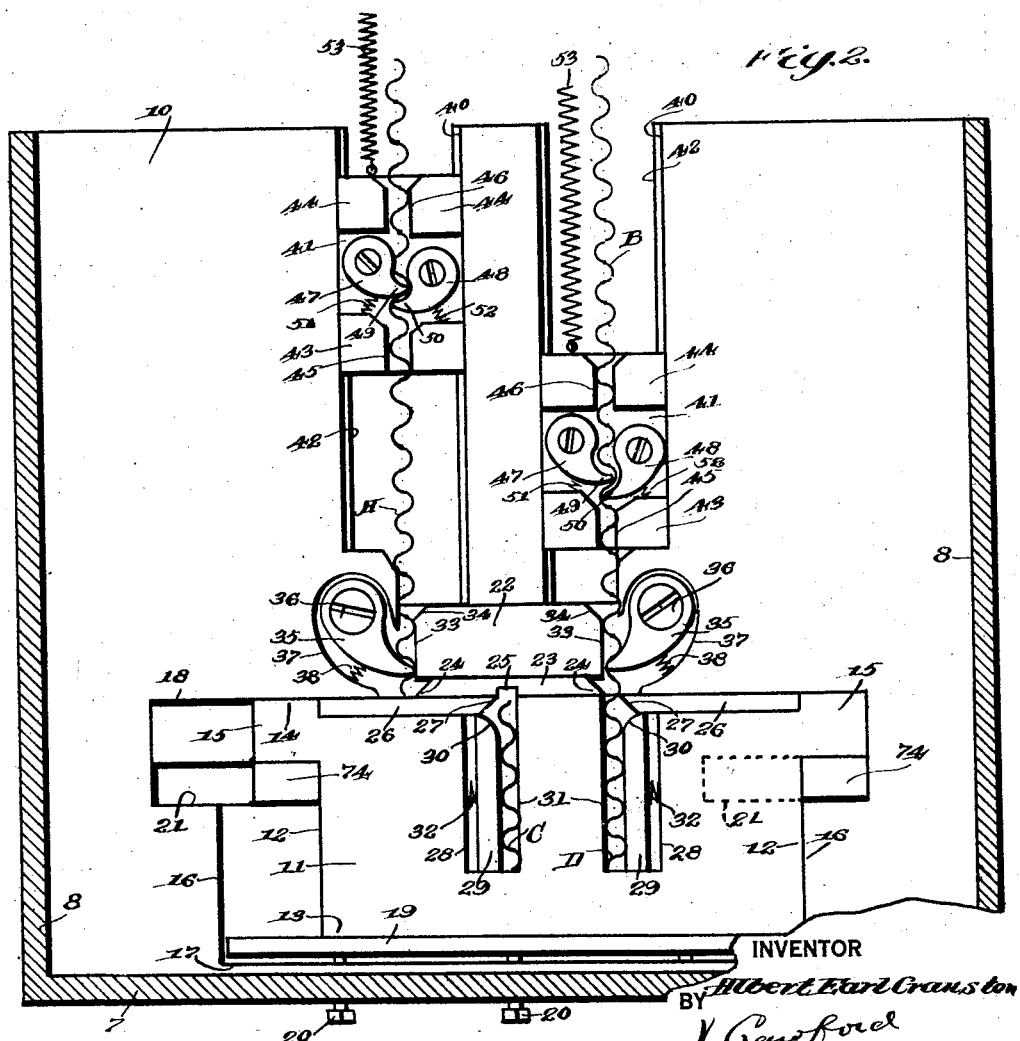
INVENTOR
Albert Earl Cranston
BY
Carl N. Crawford
ATTORNEY June 24, 1930. E. CRANSTON 1,767,580
CORRUGATED FASTENER DRIVING MECHANISM
Filed May 29, 1929 3 Sheets-Sheet 2
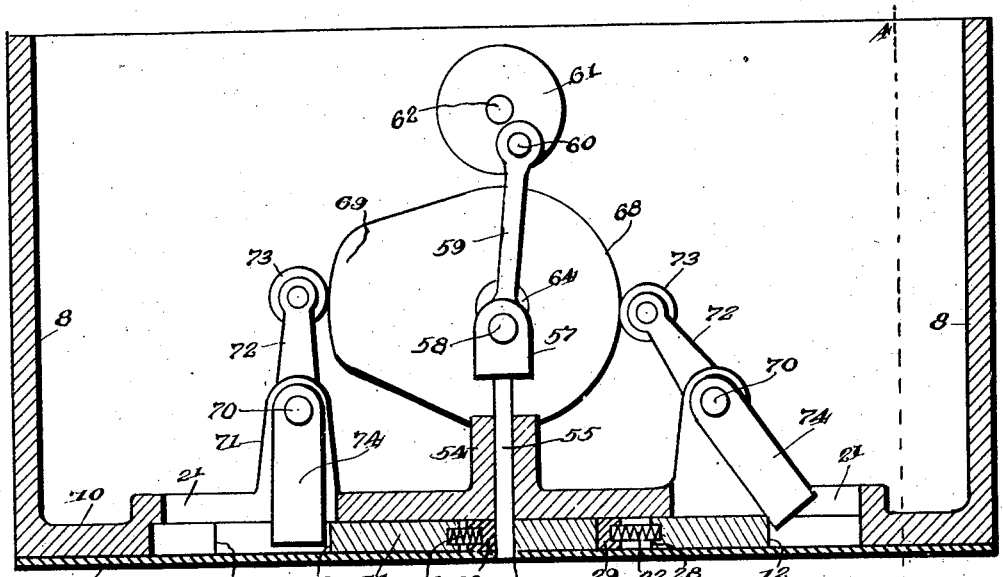
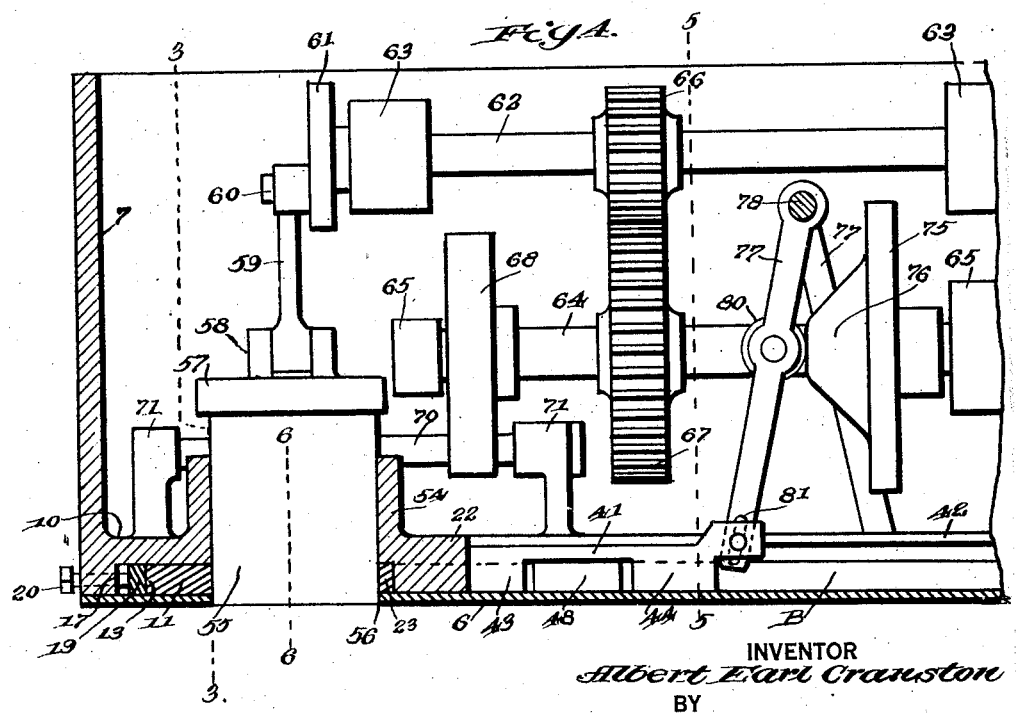
INVENTOR
Albert Earl Cranston
BY
Carl H. Crawford
ATTORNEY June 24, 1930. A. E. CRANSTON 1,767,580
CORRUGATED FASTENER DRIVING MECHANISM
Filed May 29, 1929 3 Sheets-Sheet 3
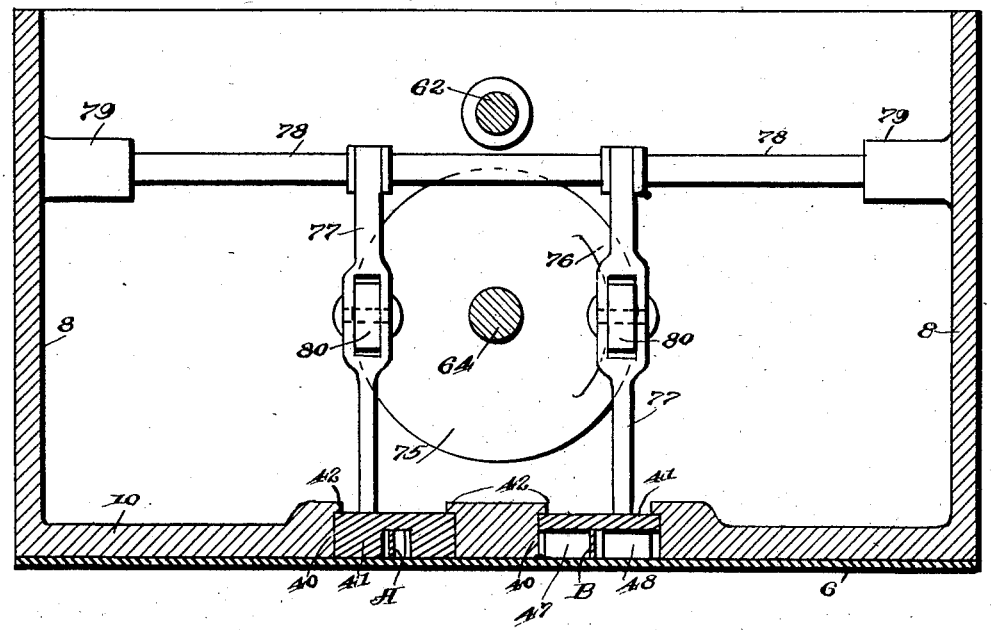
INVENTOR
Albert Earl Cranston
BY
Carl H. Crawford
ATTORNEY Patented June 24, 1930

1,767,580

UNITED STATES PATENT OFFICE

ALBERT EARL CRANSTON, OF SPOKANE, WASHINGTON

CORRUGATED-FASTENER DRIVING MECHANISM

Application filed May 29, 1929. Serial No. 367,011.

The object of this invention is to provide an improved mechanism for driving corrugated fasteners.

Corrugated fasteners are employed to unite integers of wood in lateral abutting relation to form boards of the required dimensions and one of the most important uses of such fasteners is in the box making industry in forming box ends and other solid box wall elements. In this industry, one of the greatest objects is to attain the utmost speed of production and much of the invention herein disclosed is addressed primarily to this end.

The corrugated metal strip from which the fasteners are formed is intermittently advanced into the forming mechanism and there is clearly and obviously a limit beyond which a machine is impractical in speeding up such feeding of the strip. On the contrary, the means for driving the fasteners is not handicapped by any such limitation, as the fasteners can be driven into the wood far more rapidly than it has been heretofore possible to intermittently feed and sever and finally locate the fastener in a position to be driven.

It is therefore one of the features of this invention to provide a mechanism of this character in which at least one fastener is being made from the stock while a previously formed fastener is being driven into the material thereby at least duplicating the speed of preparing fasteners compared with the heretofore limited speed with which the fasteners were driven.

Heretofore, it was thought necessary to prepare the fastener and then drive it, as no means was accessible for making up fasteners from the entering stock in advance of the fastener being driven, and hence, it is a feature of my invention to overcome this defect by employing a plurality of strips of the stock from which such fasteners are made and operate on both strips during the driving operation.

However, irrespective of whether more than one strip is being fed, it is a feature of this invention to prepare a fastener out of range of the driver while another fastener is being driven, and moving the newly prepared fastener into range of the driver to be subsequently driven, thereby making it possible for the driver to be continuously operated at a much greater speed than was heretofore possible.

The invention has many other objects and features which will be more fully described in the accompanying drawings and which will be more particularly pointed out in and by the appended claims.

In the drawings:

Fig. 1 is a view in side elevation showing the relation of my improved driving mechanism to a table on which the board integers to be united are being advanced.

Fig. 2 is an enlarged sectional view on line 2—2 of Fig. 1, with the driving mechanism frame or head block turned bottom face up.

Fig. 3 is a sectional view on line 3—3 of Fig 4, with the device in its normal position.

Fig. 4 is a sectional view on line 4—4 of Fig. 3.

Fig. 5 is a sectional view on line 5—5 of Fig. 4, looking to the right of the latter.

Fig. 6 is a sectional view on line 6—6 of Fig. 4.

Fig. 7 is a view of a box end made up of two boards secured in lateral abutting relation by the corrugated fasteners.

Like characters of reference designate similar views throughout the different figures of the drawings.

In order to afford a general idea of the application of the device of my invention, I have shown in Fig. 1, a portion of a table 1, along which an endless advancing chain 2, travels. This chain is intermittently driven, the same stopping periodically to permit the fasteners to be driven. Lugs 3, project upwardly from the chain to engage the boards 4 and advance the latter. Suitably mounted above the table is the device of my invention comprising a frame block 5, having a driving face 6, the latter consisting of a relatively thin plate of metal disposed closely adjacent the boards that are advanced by the chain 2.

I have designated the wall 7, as the front wall or that wall nearest to which the driver is disposed, and the remaining wall 8, is a side wall. This designation will serve to facilitate location of the structure with respect to the large scale views which I am now about to describe.

In Fig. 2, I have shown the frame block inverted with the plate 6 removed to show the interior parts, the observer looking at what I will term the sub-base 10, which is suitably recessed and cut away for the mounting of movable mechanism.

What I will term a transfer means is shown in the form of a plate head 11 having ends 12, a front 13, a back 14 and end extensions 15. The sub-base 10 is suitably recessed to accommodate the transfer head 11 and permit transfer or reciprocating movement thereof, the pocket being indicated at its margins at 16, 17 and 18. A tension bar 19 is shown applied to the front edge 13, of the transfer head and screws 20 serve to hold the head 11 in snug working clearance against the edge 18, the purpose of which will presently appear. The sub-base is slotted at 21 to permit of projection therethrough of means for actuating said transfer head, which means will be later described. A knife block 22 is centrally located on the sub-base and there is secured to said block a fixed or stationary knife 23 having endwise or oppositely disposed knife edges 24. A centrally disposed alining groove 25, in said knife 23, accommodates one end edge of a driver to be later described. The transfer head 11 is shown provided with knives 26, suitably recessed therein, or seated in such recesses so as to be structurally united therewith and of course suitably fastened thereto. Said knives 26 have cutting edges 27, which coact with cutting edges 24, of the fixed knife 23. It is the function of the tension bar 19 to maintain these knives in tight working clearance, as will now be clear from Fig. 2.

I will next describe the holders or holding and receiving means with which the transfer head is provided and whereby a fastener may be formed while a previously formed fastener is being driven.

As both receivers of the head 11 are alike in function and structure, like reference characters will be applied to both. Said receivers include slots 28, in head 11 which are outwardly intersected by the cutting ends of knives 26, as clearly shown in Fig. 2. In each slot 28, is a holder bar 29 having a rounded end 30 to facilitate entrance of the corrugated strip between the walls 31 and said rounded ends 30. Suitable springs 32 maintain the bars, or urge the latter toward the walls 31, of the slots 28.

The means for feeding the stock from which fasteners are formed, will next be described in detail.

The knife block 22 is provided on its ends with stock guiding faces 33 that are chamfered off at 34 to facilitate entrance of the stock. In the present invention, I draw upon two strips of material A and B, of identical form and size and which, as usual, is paid out from reels, not shown. I employ retaining means for retaining the severed ends of the stock in close relation to the holders, and as shown, said means is in the form of retaining pawls 35, pivoted at 36, in suitably formed recesses 37, in the sub-base 10. Springs 38, urge the retaining ends of said pawls against the strips A and B to hold said strips against the guiding faces 33. When the strips A and B are fed into the holders, said retaining pawls 35 ride idly abreast of and against the advancing strips but after the feeding movement ceases, these pawls retain the severed ends of the strips in the position shown in Fig. 2.

In the rear of said retaining means, the sub-base 10 is provided with guide ways 40 in which feeding heads 41 are reciprocated. Said heads 41 are slidably interposed between the driving face plate 6 and guide flanges 42, as will be clearly seen by reference to Fig. 5. Said heads 41 have pairs of end lugs 43 and 44 and each pair of lugs is spaced apart to form intervening guide ways 45 and 46 to guide the strips A and B. Between the lugs 43 and 44 are disposed pairs of feeding pawls 47 and 48 which may be slightly offset with respect to each other so that their respective feeding ends 49 and 50 will engage adjacent convolutions of the strips, as shown in Fig. 2. Said pawls 47 and 48 are urged into engagement with the strips by springs 51 and 52, and the pawls are so disposed that when a feed head is advanced toward the transfer head 11, the pawls 47 and 48 will grip and advance the strip whereas said pawls will ride idly along the strip when said heads are retracted away from head 11. I have shown springs 53 attached to said heads 41 for retracting the latter from head 11.

Reference will next be made to the means for driving the fasteners.

Referring to Figs. 3 and 4, it will be seen that the sub-base 10 has an upstanding guide 54 in which a driver 55, is slidable. The cross section of the driver 55 approximates in width and length the size of the fastener C shown in Fig. 2, and is adapted to engage said fastener edgewise and force the latter into the material. In the driving face plate 6, there is an ejecting opening 56 through which the fastener C is ejected when being forced into the material. The holders that are in position, as shown in Fig. 2, form a passage between the bar 29 and wall 31, through which the driver 55 passes when ejecting and driving a fastener. As will be clear from Figs. 2 and 4, the rear edge of the driver 55, engages the alining recess 25, in knife 23.

Reference will next be made to the operative connections and the means whereby the various parts are driven in synchronism.

A suitable head 57 is secured to the driver 55 and is pivoted at 58 to a connecting rod 59, the remaining end of which is pivoted at 60, to a crank disc 61. Said crank disc 61 is mounted on shaft 62, journalled in suitable bearings 63, and driven from any suitable source of power. By this means, the driver 55 is reciprocated. A shaft 64, journalled in suitable bearings 65, is operatively connected with shaft 62 by gears 66 and 67, with a two to one ratio favorable to shaft 62.

The transfer head 11 is reciprocated by means including a cam 68, mounted on shaft 64, and provided with a cam elevation 69, as shown in Fig. 3. Rock shafts 70, mounted in suitable bearings 71, each have a cam arm 72 provided with a roller 73, for engagement with cam 68. On each shaft 70, is mounted a head shifting arm 74 which projects through the slots 21, into engagement with opposite edge 12 of head 11. When the cam 68 is in the position shown in Fig. 3, the head 11 is shifted to dispose the left hand holder in registry with the driver and the right hand holder is in receiving registry with strip B, as will be seen from Fig. 2. When the cam 68 makes a half revolution, the elevation 69 will shift the head 11 to the left of Fig. 3, disposing the right hand holder in registry with the driver. It will now be clear why shaft 62 is driven at twice the speed of shaft 64, since the head 11 must shift at each stroke of the driver.

Reference will next be made to the means for actuating the feeders or feeder heads to advance the latter toward the transfer head.

A cam 75 is mounted on shaft 64 and is provided with a single elevation 76 projecting from the face of the cam. Cam levers 77 are mounted on a lever shaft 78, suitably journalled at 79 and extend downwardly abreast of cam 75. Said levers are each provided with a roller 80 for engagement by said cam elevation and the lower ends of said levers are shown connected with the feeder heads 41, by pin and slotted attachment indicated at 81. The springs 53 urge the feeder heads 41 to the right of Fig. 4, and hence the rollers 80 are always in engagement with the cam 75. As the elevation 76 reaches one of the rollers 80, it shifts its respective lever to the left of Fig. 4, as clearly shown. A half revolution will of course bring the elevation 76 to the other roller 80, as will now be clear. Thus, the feeder heads 41 are alternately shifted toward and retracted from the transfer head 11.

While the operation may be clear from the foregoing, it will be briefly recapitulated as follows:

Referring more particularly to Fig. 2, the head 11 has been shifted to the right and the left hand holder has moved fastener C into registry with the ejector opening 56 and the driver 55, and hence, the fastener is about to be driven into the material to be united. At this period of rest of the plate 11, and in this position thereof, the right hand holder has been moved into registry with strip B and the right hand feeder head 41 has been advanced toward the plate 11 and has fed into the right hand holder a length of strip B sufficient to form a fastener. Immediately subsequent to this performance, the right hand feeder head will have been released and retracted by its spring 53, the right hand retaining pawl 35, holding the strip against retraction with the receding head.

Thus it will be clear that prior to severance of the strip B, retraction of the right hand head has taken place. Now it will be assumed that the driver 55 has descended and driven the fastener C into the material and then retracted to the Fig. 4 position leaving the left hand fastener holder empty, whereupon, the plate head 11 will be shifted from the right to the left of the pocket recess, by arms 74. Almost instantly with this shifting movement, the right hand knife 26 will coact with the right hand cutting edge of knife 23, and sever the strip B thereby forming fastener D, in the right hand holder. This shift of plate 11, will move the right hand holder with fastener D, into registry with the driver 55, and will dispose the left hand holder in receiving relation with strip A. It will be seen that the left hand retaining pawl 35 is holding the severed end of strip A, in readiness for entrance into the left hand holder and just as soon as the latter has reached a position of registry with strip A, the left hand feeder head 41 will be advanced to feed a length of strip A into the left hand holder and the cycle of operation will be continuously repeated as heretofore described.

It will now be clear that irrespective of whether more than one strip is employed, I have disclosed a feature which consists in making up a fastener while a previously formed fastener is being driven, and moving the completed fasteners into range of the driver.

However, I prefer to draw upon a plurality of stock strips and move them into range of the driver whereby a greatly accelerated speed may be obtained as compared to any device of this character known to me.

It will now be clear that I have shown mechanism which may comprise or include the transfer head with its holders which constitutes a holding structure whereby with the knives, lengths of each corrugated strip may be severed to form fasteners adapted to be received by the holding structure and moved into range of the driver.

While I have herein shown and described one specific form of my invention, I do not wish to be limited thereto except for such limitations as the claims may import.

I claim:

1. In a corrugated fastener driving mechanism, a frame block having a driving face abreast of the advancing material to be fastened and having an ejector opening, a driver for forcing a fastener through said opening into the material, a transfer head having a plurality of fastener holders, a plurality of corrugated strip feeders one for each holder for feeding a strip thereto, means for actuating said transfer head to advance a fastener into registry with said driver and ejector opening, and means for severing a strip to form a fastener as said head is being actuated.

2. In a corrugated fastener driving mechanism, a frame block having a driving face abreast of the advancing material to be fastened and being provided with an ejector opening, a driver for forcing a fastener through said opening into the material, a reciprocating transfer head having a pair of fastener holders, a corrugated strip feeder for each holder, means for shifting said transfer head to advance a fastener into registry with said driver and opening and disposing an empty holder into registry with its strip feeder for feeding a strip thereto while a fastener is being driven, and means for severing the strips into fasteners as said transfer head is being shifted.

3. In a corrugated fastener driving mechanism, a frame block having a driving face provided with an ejector opening abreast of the advancing material, a driver for forcing a fastener through said opening into the material, a fixed strip severing knife having endwise disposed knife edges, a reciprocating transfer head having a pair of fastener holders and provided with a knife adjacent each holder, means for advancing corrugated strips into said holders to form fasteners, means for reciprocating said transfer head to cause said knives to sever the strips into fasteners and dispose a fastener into registry with said opening and driver.

4. In a corrugated fastener driving mechanism, a driver for forcing a fastener into the material, a transfer head having a pair of fastener holders, means for shifting said head to alternately dispose said holders into range of said driver, means for feeding a corrugated strip into that holder out of range of said driver, and means for severing said strip to form a fastener as said head is being shifted.

5. In a corrugated fastener driving mechanism, a driver for forcing a fastener into the material, a transfer head having a pair of fastener holders for consecutively advancing fasteners into range of said driver, a strip feeder for each holder, means for severing the strips into fasteners as said head is shifted, and means for retaining the end of the severed strips closely adjacent the respective holders thereof to facilitate entrance of the strips into the respective holders when the latter are shifted to form new fasteners.

6. In a corrugated fastener driving mechanism, a driver for forcing a fastener into the material, a transfer head having a pair of fastener holders, a strip feeder for each holder, means for shifting said head to alternately move fasteners into range of said driver, means for severing the strips to form fasteners as said head is shifted, and retaining pawls adapted to ride idly on said corrugated strips as the latter are fed into said holders and retaining the severed strip ends in positions of registry with the holders as the latter are shifted to form new fasteners.

7. In a corrugated fastener driving mechanism, a plurality of corrugated strip feeders each adapted to feed a corrugated strip, a driver for forcing a corrugated fastener into the material, and mechanism for severing lengths from each strip to form fasteners and including holders for receiving and moving the formed fasteners into range of said driver.

8. In a corrugated fastener driving mechanism, a plurality of corrugated strip feeders each adapted to feed a corrugated strip, a driver for forcing a corrugated fastener into the material, and mechanism for successively severing lengths from each strip to form fasteners and including a holding structure for receiving the formed fasteners and successively moving said fasteners into range of said driver.

9. In a corrugated fastener driving mechanism, a plurality of corrugated strip feeders each adapted to feed a corrugated strip, a driver for forcing a corrugated fastener into the material, and mechanism for severing lengths from each strip to form fasteners and including a holding structure for receiving the formed fasteners and moving the latter into range of said driver.

In witness whereof I hereby affix my signature.

ALBERT EARL CRANSTON.